United States Patent [19]

Robinson

[11] Patent Number: 4,560,143
[45] Date of Patent: Dec. 24, 1985

[54] PRESSURE COOKER RELIEF VALVE ASSEMBLY

[75] Inventor: Geoffrey Robinson, Burnley, England

[73] Assignee: The Prestige Group PLC, London, England

[21] Appl. No.: 597,988

[22] Filed: Apr. 9, 1984

[51] Int. Cl.[4] .............................................. F16K 31/00
[52] U.S. Cl. ................................... 251/338; 137/523; 137/532; 220/203
[58] Field of Search ........................ 251/338, 251, 262; 126/369, 389; 219/431, 440, 438, 439, 441; 220/3, 367, 203, 206, 208; 137/523, 532, 533, 534

[56] References Cited

U.S. PATENT DOCUMENTS 1,698,977  1/1929  Wentorf ............................ 137/523
2,633,870  4/1953  Lind .................................. 220/203
3,527,247  9/1970  Pelster ............................... 137/523
4,370,999  2/1983  Sebillotte .......................... 137/532

FOREIGN PATENT DOCUMENTS 1188831  9/1959  France .
 312563  5/1929  United Kingdom .

Primary Examiner—Samuel Scott
Assistant Examiner—Noah Kamen
Attorney, Agent, or Firm—Young & Thompson

[57] ABSTRACT

A relief valve assembly for pressure cookers in which the valve port is controlled by a predetermined weight. A skirt portion forming part of the mass of the weight surrounds the valve port so forming a chamber. The skirt portion has an opening in it such that gas entering the chamber from the pressure cooker via the valve port can escape to the atmosphere in a predetemined direction, e.g. away from a hand grip portion.

6 Claims, 11 Drawing Figures

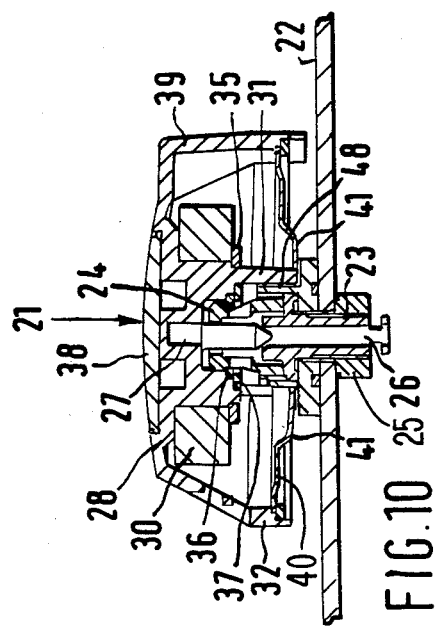
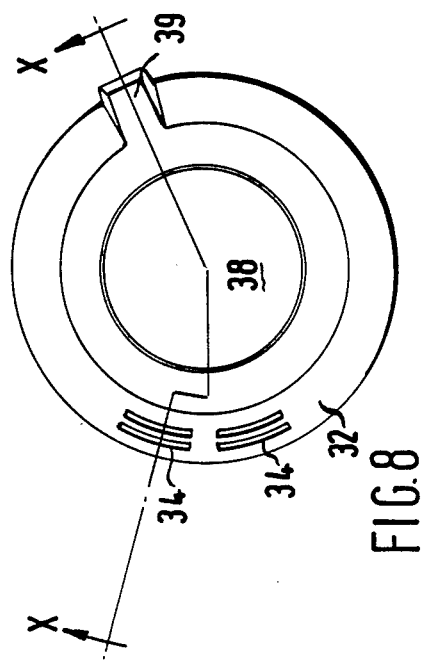
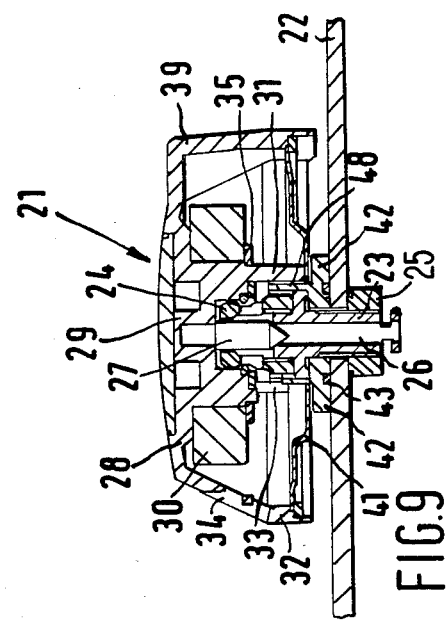
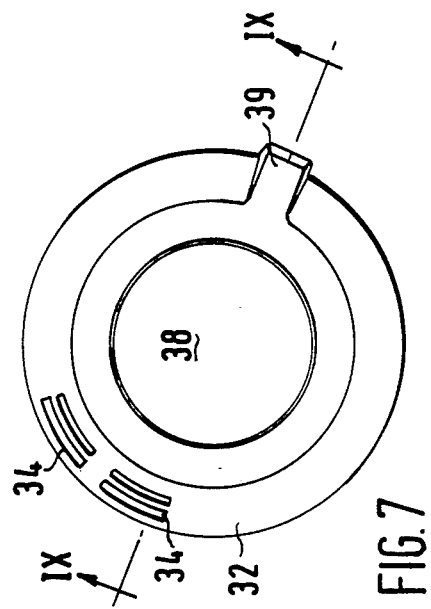

PRESSURE COOKER RELIEF VALVE ASSEMBLY

BACKGROUND OF THE INVENTION

This invention relates to a pressure cooker relief valve assembly and to a pressure cooker incorporating such an assembly.

Pressure cookers of the domestic type generally have an escape port, usually in the removable cover of the cooker, and the pressure within the cooker is regulated by a relief valve controlling the port. Relief valves are well known and a common type comprises a valve member and a valve seating, one of which acts against the other under pressure of a predetermined weight. When it is desired to vent the cooker, for example, when cooking is finished, the valve has to be opened. This can cause a rapid escape of steam and hence the operator has to take care to avoid being scalded.

SUMMARY OF THE INVENTION

According to the invention there is provided a pressure cooker relief valve assembly comprising a valve member and a valve seating one of which acts against the other under the pressure of a predetermined weight to close a valve port, the assembly including a skirt portion surrounding the valve port to form a chamber, the chamber having an opening in the skirt portion so that gas entering the chamber through the valve port can escape from the chamber to the atmosphere in substantially a sinqle predetermined direction and the skirt portion forms part of the mass of the predetermined weight.

The opening in the chamber enables escaping gases (e.g. steam) to be directed away from the user and escaping steam may also entrain air which can help to provide cooler conditions for the user in the vicinity of the valve. The skirt portion forms part of the mass of the predetermined weight and thus the valve member including the chamber can form a compact design which may be easily removed as a unit in order to gain access to the valve seating, e.g. for cleaning purposes.

The dimensions and shape of the chamber and the opening may be chosen to lessen the noise level of steam discharging from the valve.

Preferably the valve member includes a hand grip portion to enable the valve to be manually manipulated (e.g. to open the valve) and the opening in the skirt is arranged to direct escaping gases away from the hand grip portion.

In a preferred embodiment the chamber has an inner wall surrounding the valve port, the inner wall having an opening therethrough such that gas from the valve port can pass into the chamber through the opening in the inner wall and from the chamber to the atmosphere through the opening in the skirt portion.

With many existing types of pressure cookers it is necessary to manually lift the weight off the valve seating when it is desired to open the valve. This operation requires the weight to be firmly grasped and this can be a disadvantage if escaping steam is issuing from the valve. Alternative methods of venting the cooker include lifting the weight by means of, for example, a pivoted lever or a sliding wedge. These mechanical methods for lifting the weight are complicated and hence expensive to produce.

Accordingly the pressure cooker relief valve assembly may include means for relieving the pressure of the weight by axially rotating the weight and a cam surface relative to each other, the rotation causing the weight to be tilted relative to the valve seating. The valve assembly can be opened by simple rotation of the weight relative to the cam surface. Either the weight or the cam surface or both can be rotated. Preferably the cooker is vented by manual rotation of the weight in which case the weight need only be handled momentarily to turn it through a small angle. In an alternative embodiment the rotation may be achieved by, for example, a clockwork timer acting through a linking mechanism. The tilt of the weight caused by the rotation, whether manual or mechanical, can aid in directing the escaping steam in a predetermined direction, e.g. away from the user, especially if the underside of the weight is in close proximity to another surface. The direction of the escaping steam is further controlled by the opening in the surrounding chamber as explained above, through which any gas (e.g. steam) entering the chamber through the valve port can escape.

The invention also provides a pressure cooker incorporating a relief valve assembly as set forth above.

BRIEF DESCRIPTION OF THE DRAWING

Embodiments of the invention will now be described with reference to the accompanying drawings in which

FIG. 7 is a plan view from above of a modified pressure relief valve in the closed position FIG. 8 is a plan view from above of the pressure relief valve of FIG. 7 in the open position FIG. 9 is a cross-sectional side elevation of the modified pressure relief valve as viewed in the direction IX—IX of FIG. 7

FIG. 10 is a cross-sectional side elevation of the modified pressure relief valve as viewed in the direction X—X of FIG. 8

DETAILED DESCRIPTION OF THE INVENTION

Figure 1:
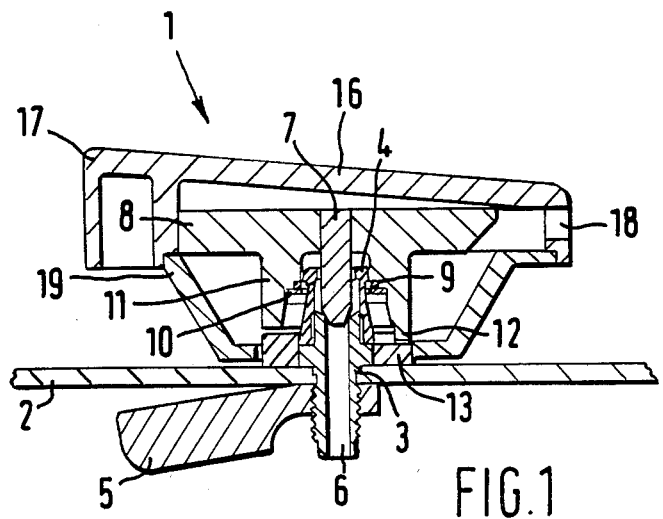
FIG. 1 is a cross-sectional side elevation of one embodiment of pressure relief valve assembly mounted on a lid of a pressure cooker
Figure 2:
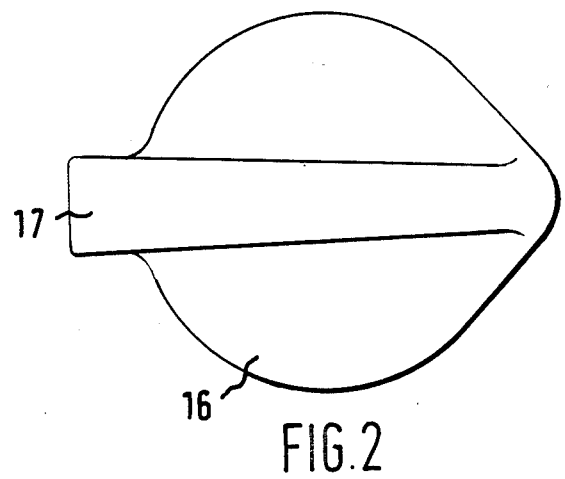
FIG. 2 is a plan view from above of the pressure relief valve assembly of FIG. 1

As shown in the FIGS. 1 to 6 of the drawings, the first embodiment of a pressure relief valve assembly is indicated generally by reference numeral 1 and is mounted on the lid 2 of a pressure cooker. The assembly includes a valve of known type including a valve seating 3, incorporating a valve support 4, held in position by a wing nut 5 within the lid 2. A port 6 extends through the seating 3 and this can be closed by a valve pin 7. A weight 8 is attached to the upper end of the pin 7.

The weight 8 is retained by the valve support 4 by means of a snap ring 9 and locking ring 10 such that the pin 7 can rotate in the seating 3 and be tilted and lifted by the mechanism described hereinafter or the weight 8 with its attachments can be removed from the seating 3 for cleaning purposes.

Figure 3:
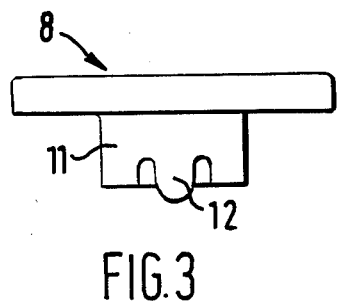
FIG. 3 is a side elevation, as viewed from the right of FIG. 1, of the weight valve of the valve assembly
Figure 4:
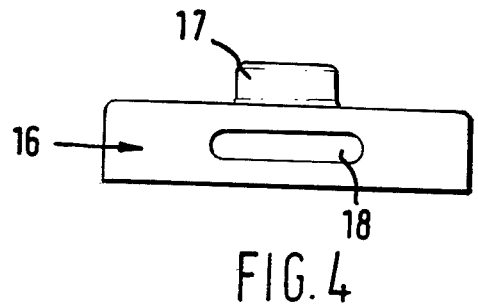
FIG. 4 is a side elevation, as viewed from the right of FIG. 1, of the weight cover of the valve assembly

The weight 8 has an inner depending skirt section 11 including an elongated prong member 12 (as specifically shown in FIG. 3).

Mounted on the lid 2 below the weight 8 is a valve seat collar 13, the structure of which is shown specifically in FIG. 5. The upper face of the collar comprises a cam surface consisting of a flat surface 14 and a recess 15.

Attached to the weight 8, and covering its upper surface, is a cover 16. The cover 16 includes a hand grip portion 17 and an opening 18 (shown most clearly in FIG. 4) in a side wall opposite to the hand grip portion. Extending from the cover 16 are side walls 19 forming an outer skirt which together with the cover 16 forms a chamber surrounding the valve.

In the position shown in FIG. 1 the valve is in the closed or sealed position. The prong member 12 of the weight 8 is within the recess 15 of the collar 13 and the pin 7 is firmly seated on the valve seating 6.

When it is desired to open the valve the cover 16 is rotated through a small angle thus rotating the weight 8. The prong member 12 is thus cammed out of the recess 15 on to the top face 14 of the collar 13. This causes the weight 8 to be tilted and raised, lifting the pin 7 off the seat 3. The valve is thus opened. Any steam within the pressure cooker is released into the chamber formed by the cover 16 and side walls 19 and out through the opening 18, in a direction away from the hand grip 17. The dimensions and shape of the chamber and the opening are chosen so as to minimise the noise level of the escaping steam.

Figure 5:
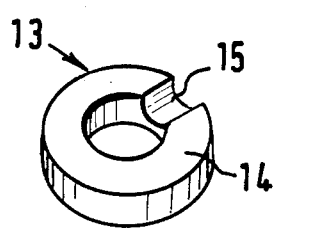
FIG. 5 is a perspective view of the valve seat collar of the valve assembly of FIG. 1
Figure 6:
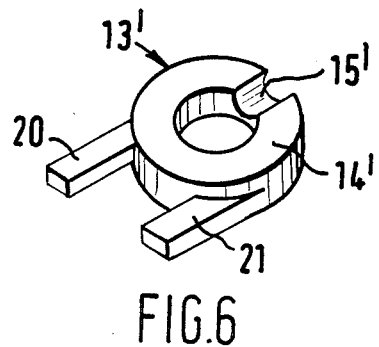
FIG. 6 is a perspective view of a modified form of valve seat collar
Figure 11:
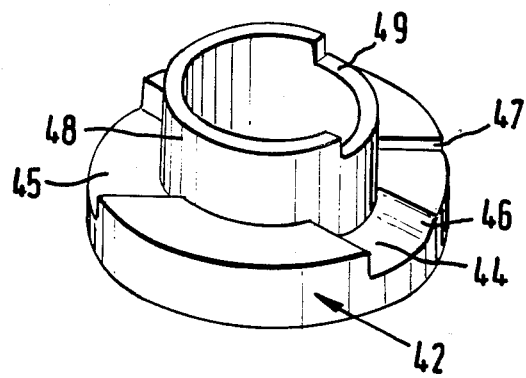
FIG. 11 is an isometric view of the valve seat collar of the modified pressure relief valve.

The modified valve seat collar 13' shown in FIG. 6 is similar to that shown in FIG. 5 in having a recess portion 15' and a flat surface 14' forming a cam surface for the prong member 12. The collar 13', however, has two horizontal extensions 20 and 21. A downward extension of the weight 8 can fall between extensions 20 and 21, so that the extensions act as stop members only allowing rotation of the weight through a small angle.

The modified pressure relief valve assembly will now be described with reference to FIGS. 7 to 11. The modified assembly is indicated generally by reference numeral 21 and is mounted on the lid 22 of a pressure cooker. The assembly includes a valve of known type including a valve seating 23, incorporating a valve support 24, held in position by a nut 25 within the lid 22. A port 26 extends through the seating 23 and this can be closed by a valve pin 27. A weight indicated generally by reference numeral 28 is attached to the upper end of the pin 27. The weight 28 comprises a plastic moulding 29 and an annular metal weight ring 30. The moulding 29 has an inner depending skirt portion 31 and an outer depending skirt portion 32. The inner skirt portion 31 has a slot 33 in one face. The outer skirt portion 32 has slits 34 in a corresponding face.

The weight ring 30 is retained on the moulding 29 by means of a washer 35.

The valve assembly 21 is detachably mounted on the valve support 24 by means of a snap ring 36, held in position by means of a washer 37, such that the pin 27 can rotate in the seating 23 and be tilted and lifted by the mechanism described hereinafter or the assembly 21 can be removed from the seating 23 for cleaning purposes.

A cover 38 hides the upper surface of the moulding 29 and a handle 39 is provided to enable the valve assembly to be held and rotated.

A metal plate 40 extends substantially perpendicular to the outer skirt portion 32 and forms a bottom wall of the chamber. The metal plate 40 is provided with two cam lobes 41 which co-operate with the cam surface of the valve seat collar 42, described hereinbelow.

The valve seat collar 42 is mounted on the lid 22 below the weight 28. An O-ring 43 is retained between the collar 42 and the lid 22. The collar 42 has two recesses 44, 45 to receive the lobes 41. The recess 44 has a cammingsurface comprising a ramp 46. A stop 47 is provided by the vertical end wall of the recess 44. The collar 42 has an upstanding skirt portion 48, which in use, is situated within the inner skirt 31 of the weight 28. A cut-away portion 49 is provided in one face of the skirt portion 48.

In the position shown in FIGS. 7 and 9 the valve is in the closed or sealed position. The lobes 41 are situated within the recesses 44 and 45 of the collar 42 and the pin 27 is firmly seated on the valve seating 23.

When it is desired to open the valve the assembly 21 is rotated through a small angle by means of the handle 39. The lobe 41 within the recess 44 is cammed up the ramp 46 until further rotation is prevented by stop 47. The camming action causes the weight to be tilted and raised, as shown in FIGS. 8 and 10, lifting the pin 27 off the seat 23. The valve is thus opened. Any steam within the pressure cooker is released through the port 26, through holes in the valve support 24, out through the cut-away portion 49 in the skirt 48, through the slot 33 in the inner skirt portion 31 into the chamber between the inner and outer skirt portions 31, 32. The steam escapes from the chamber, in a direction away from the handle 39, via the slits 34 in the outer skirt portion 32, the slits being designed to deflect the steam in a partial upwards direction so as to control its forward projection. The dimensions and shape of the chamber and the various openings are chosen so as to minimise the noise level of the escaping steam.

I claim:

1. A pressure cooker relief valve assembly comprising: a valve port; a valve member; a valve seating; a weight assembly that urges the valve member and valve seating together to close the valve port; and means preventing rotation of the weight assembly by escaping gas; and in which the weight assembly includes: a first substantially annular wall surrounding the valve port and defining a first chamber into which gas from the valve port empties; a second substantially annular wall spaced from and concentric with said first wall and defining a second chamber, there being a passageway between said chamber through which gas moves from said first chamber to said second chamber; and an opening in said second wall through which gas escapes from said second chamber in a generally predetermined direction.

2. The pressure cooker relief valve assembly according to claim 1 including a hand grip and in which the opening in said second wall directs gas away from the hang grip.

3. The pressure cooker of claim 1 in which the second wall forms a skirt and constitutes part of the mass of the weight assembly.

4. The pressure cooker of claim 1 in which the first wall forms part of the mass of the weight assembly.

5. The pressure relief valve assembly according to claim 1 in which said first wall is an inner wall and said second wall is an outer wall surrounding and spaced from said inner wall.

6. The pressure cooker relief valve assembly according to claim 1 and a cam; and a cam follower, the cam and cam follower being arranged so that relative rotation causes lifting of at least a part of the valve member off the valve seating to vent the cooker.

* * * * *